US010638031B1

(12) United States Patent
Brodie et al.

(10) Patent No.: US 10,638,031 B1
(45) Date of Patent: Apr. 28, 2020

(54) ADDITIVE COIL STRUCTURE FOR VOICE COIL MOTOR ACTUATOR

(71) Applicant: Apple Inc., Cupertino, CA (US)

(72) Inventors: Douglas S. Brodie, Los Gatos, CA (US); Aurelien R. Hubert, Saratoga, CA (US); Scott W. Miller, Los Gatos, CA (US); Shashank Sharma, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/940,688

(22) Filed: Mar. 29, 2018

Related U.S. Application Data

(60) Provisional application No. 62/478,486, filed on Mar. 29, 2017.

(51) Int. Cl.
*H04N 5/232* (2006.01)
*H02K 33/02* (2006.01)
*G03B 13/36* (2006.01)
*G02B 7/09* (2006.01)
*H02K 41/035* (2006.01)
*H02K 15/04* (2006.01)

(52) U.S. Cl.
CPC ........... *H04N 5/23212* (2013.01); *G02B 7/09* (2013.01); *G03B 13/36* (2013.01); *H02K 15/0407* (2013.01); *H02K 33/02* (2013.01); *H02K 41/0356* (2013.01)

(58) Field of Classification Search
CPC ........... H02P 7/025; G03B 13/36; G02B 7/09; H04N 5/23212
See application file for complete search history.

(56) References Cited

U.S. PATENT DOCUMENTS

| 7,352,662 | B2 | 4/2008 | Cho et al. | |
|---|---|---|---|---|
| 7,567,396 | B2 | 7/2009 | Ji | |
| 9,122,071 | B2 | 9/2015 | Yu | |
| 9,377,632 | B2 | 6/2016 | Hu et al. | |
| 2006/0153556 | A1* | 7/2006 | Lee | G02B 7/08 396/133 |
| 2006/0193620 | A1 | 8/2006 | Harrington et al. | |
| 2007/0154198 | A1* | 7/2007 | Oh | G02B 7/102 396/85 |
| 2008/0297295 | A1 | 12/2008 | Yamazaki et al. | |
| 2011/0109419 | A1 | 5/2011 | Cooper et al. | |
| 2016/0109721 | A1 | 4/2016 | Min et al. | |
| 2016/0274375 | A1 | 9/2016 | Park et al. | |
| 2016/0282601 | A1 | 9/2016 | Kono et al. | |

OTHER PUBLICATIONS

U.S. Appl. No. 14/569,480, filed Dec. 12, 2014, Lee et al.

* cited by examiner

*Primary Examiner* — Ahmed A Berhan
(74) *Attorney, Agent, or Firm* — Robert C. Kowert; Kowert, Hood, Munyon, Rankin & Goetzel, P.C.

(57) ABSTRACT

Some embodiments include a camera voice coil motor (VCM) actuator that includes an additive coil structure for shifting a lens along one or multiple axes. The additive coil structure may include a base portion configured to couple with a lens carrier and at least partially surround a perimeter of the lens carrier. In various examples, the additive coil structure may include folded portions that individually include a respective coil that is located proximate a respective magnet. According to various embodiments, the additive coil structure may be formed using an additive process.

20 Claims, 10 Drawing Sheets

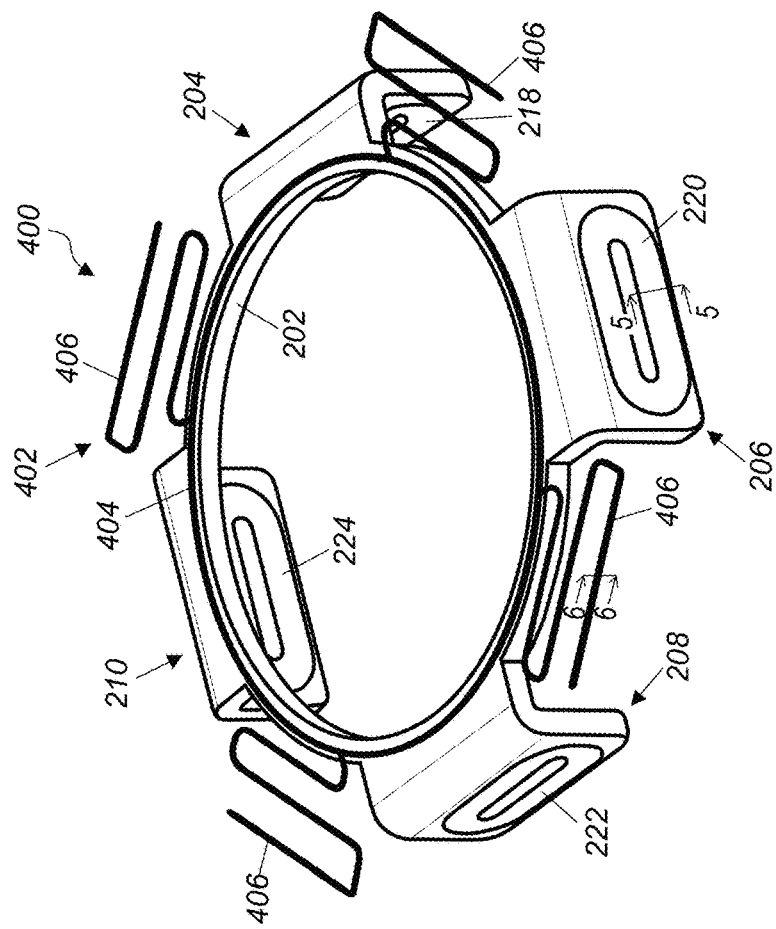
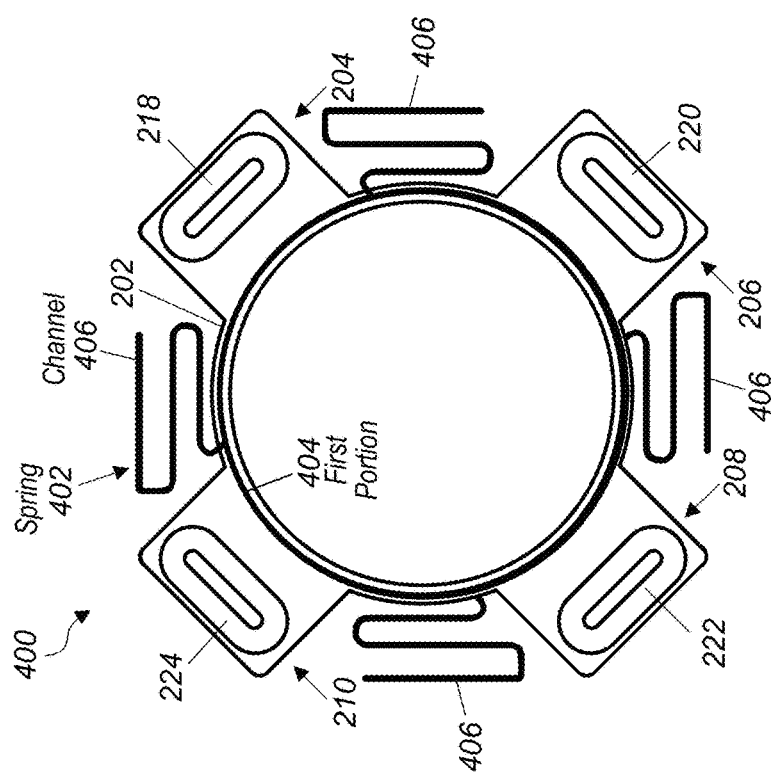

ADDITIVE COIL STRUCTURE FOR VOICE COIL MOTOR ACTUATOR

This application claims benefit of priority to U.S. Provisional Application No. 62/478,486, filed Mar. 29, 2017, titled "Additive Coil Structure for Voice Coil Motor Actuator", which is hereby incorporated by reference in its entirety.

BACKGROUND

Technical Field

This disclosure relates generally to a camera actuator and more specifically to a voice coil motor (VCM) camera actuator that includes an additive coil structure for shifting a lens along one or multiple axes.

Description of the Related Art

The advent of small, mobile multipurpose devices such as smartphones and tablet or pad devices has resulted in a need for high-resolution, small form factor cameras for integration in the devices. Some small form factor cameras may incorporate optical image stabilization (OIS) mechanisms that may sense and react to external excitation/disturbance by adjusting location of the optical lens on the X and/or Y axis in an attempt to compensate for unwanted motion of the lens. Some small form factor cameras may incorporate an autofocus (AF) mechanism whereby the object focal distance can be adjusted to focus an object plane in front of the camera at an image plane to be captured by the image sensor. In some such autofocus mechanisms, the optical lens is moved as a single rigid body along the optical axis (referred to as the Z axis) of the camera to refocus the camera.

SUMMARY OF EMBODIMENTS

Some embodiments include a camera. The camera may include a lens, an image sensor, and a VCM actuator. The lens may define an optical axis. In various embodiments, the VCM actuator may include a lens carrier, a magnet, and a coil structure. The lens carrier may be configured to hold the lens. For instance, the lens may be coupled to the lens carrier such that the lens moves together with the lens carrier. In some embodiments, the VCM actuator may be configured to shift the lens, relative to the image sensor, based at least in part on magnetic interaction between the coil and the magnet. The lens may include one or more optical elements, e.g., the lens may be a "lens stack" of multiple lenses.

In various examples, the coil structure may include a base portion and at least one folded portion. The base portion may be attached to the lens carrier. Furthermore, the base portion may surround a perimeter of the lens carrier. The folded portion may include at least one coil. In some embodiments, the folded portion extends from the base portion in a folded arrangement such that the coil is located proximate the magnet. According to various embodiments, the coil is formed of additive layers (e.g., via an additive process).

In some cases, the VCM actuator may include a spring that connects the coil structure to a static member of the camera. For instance, the coil structure may be supported at least partly via the spring. In some examples, the spring may be formed of a metal substrate from which the coil structure is additively formed. In other examples, the coil structure may include one or more electrodes on the base portion, and the spring may be coupled to the base portion via the one or more electrodes. According to some embodiments, the spring may include one or more electrical traces configured to route current to the at least one coil to drive the coil.

Some embodiments include a voice coil motor (VCM) actuator. The VCM actuator may include a moveable member, a plurality of magnets (e.g., dual pole magnets), and a coil structure. The coil structure may include a base portion and folded portions. The base portion may be configured to attach to the moveable member. Furthermore, the base portion may be configured to surround at least a portion of the moveable member, e.g., along a first plane. The folded portions may individually include a respective coil of a plurality of coils. In some embodiments, each of the folded portions extends from the base portion in a folded arrangement such that current flows through the respective coil along a respective plane that is orthogonal to the first plane. Furthermore, in various embodiments, each of the plurality of coils may be formed of additive layers. In some examples, the VCM actuator may be configured to move the moveable member based at least in part on magnetic interaction between at least one of the plurality of coils and at least one of the plurality of magnets. According to some examples, the folded portions of the coil structure may be additively formed together with the base portion of the coil structure. The additive layers may include a conductive material (e.g., copper) and an insulating material (e.g., polyimide).

Some embodiments include a method of manufacturing a voice coil motor (VCM) actuator. The method may include forming a flat coil structure that includes a plurality of actuator coils. For instance, the flat coil structure may be formed using an additive process. Furthermore, the method may include folding portions of the flat coil structure to form a folded coil structure.

In some implementations, as part of forming the flat coil structure, the method may include forming a spring. In other implementations, the spring may not be formed as part of forming the flat coil structure. In such cases, the spring may be coupled to the coil structure.

BRIEF DESCRIPTION OF THE DRAWINGS

FIG. 3A illustrates a bottom view of the additive coil structure in a flat state. FIG. 3B illustrates a perspective view of the additive coil structure in a folded state.

FIGS. 4A and 4B illustrate yet another example additive coil structure of a voice coil motor (VCM) actuator, in accordance with some embodiments. In FIGS. 4A and 4B, the additive coil structure may include a spring that is formed together with the additive coil structure. FIG. 4A illustrates a bottom view of the additive coil structure in a flat state. FIG. 4B illustrates a perspective view of the additive coil structure in a folded state. In some embodiments, the additive coil structure may include one or multiple features, components, and/or functionality of embodiments described herein with reference to FIGS. 1-3B and 5-12.

Figure 1:
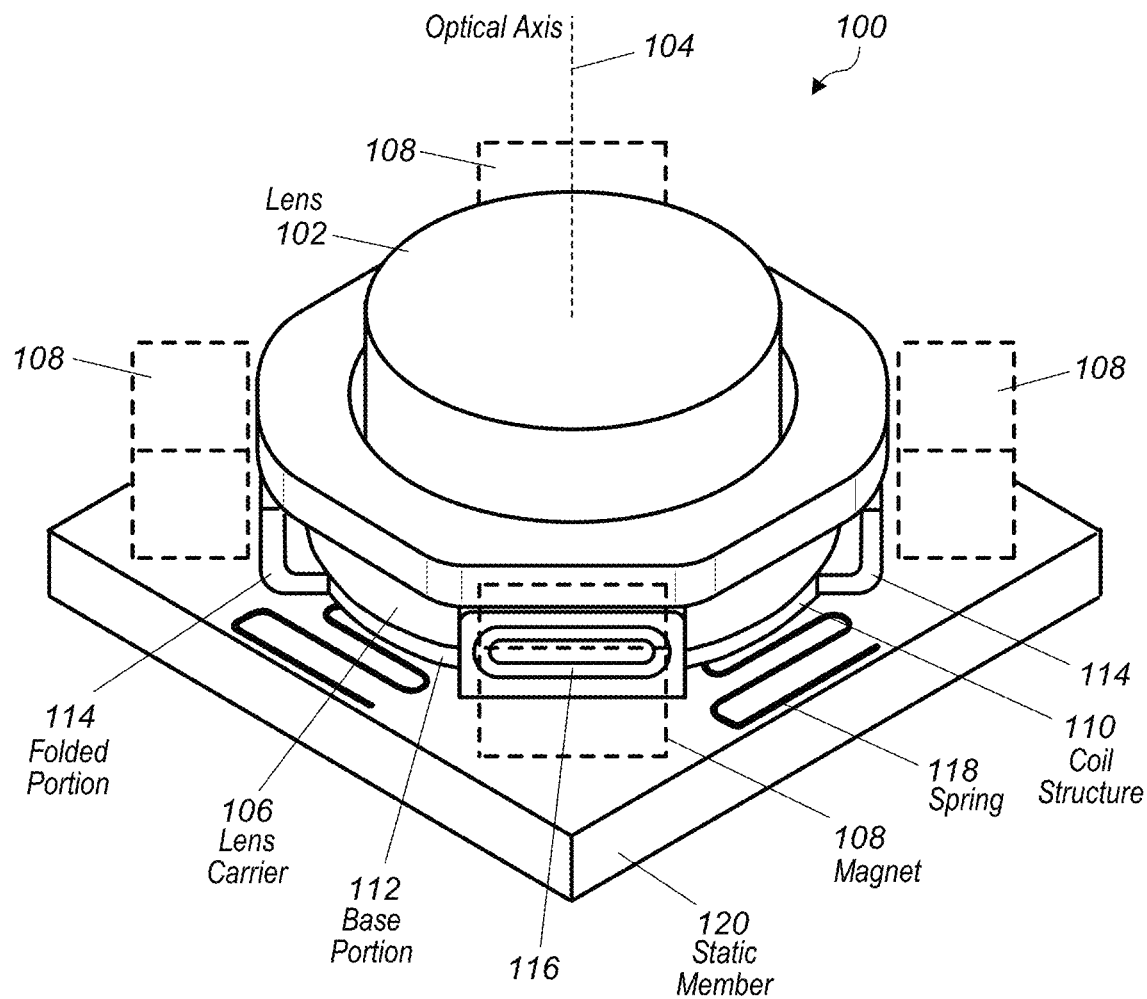
FIG. 1 illustrates a perspective view of an example camera module that includes a voice coil motor (VCM) actuator with an additive coil structure, in accordance with some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f) for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Some embodiments include camera equipment outfitted with controls, magnets, and voice coil motors to improve the effectiveness of a miniature actuation mechanism for a compact camera module. More specifically, in some embodiments, compact camera modules include actuators to deliver functions such as autofocus (AF), optical image stabilization (OIS), and/or tilt. One approach to delivering a very compact actuator for OIS is to use a voice coil motor (VCM) arrangement.

In some embodiments, a camera may include a lens, an image sensor, and a VCM actuator. The lens may define an optical axis. The image sensor may be configured to capture light passing through the lens. Furthermore, the image sensor may be configured to convert the captured light into image signals. In various embodiments, the VCM actuator may include a lens carrier, a magnet, and a coil structure. The lens carrier may be configured to hold the lens. For instance, the lens may be coupled to the lens carrier such that the lens moves together with the lens carrier. The lens may include one or more optical elements, e.g., the lens may be a "lens stack" of multiple lenses.

In various examples, the coil structure may include a base portion and at least one folded portion. The base portion may be attached to the lens carrier. Furthermore, the base portion may surround a perimeter of the lens carrier. The folded portion may include at least one coil. In some embodiments, the folded portion extends from the base portion in a folded arrangement such that the coil is located proximate the magnet. According to various embodiments, the coil is formed of additive layers (e.g., via an additive process).

In some embodiments, the VCM actuator may be configured to shift the lens, relative to the image sensor, based at least in part on magnetic interaction between the coil and the magnet. In some instances, the VCM actuator may be configured to move the lens along the optical axis and/or in directions orthogonal to the optical axis and/or orthogonal to the image sensor. Additionally, or alternatively, the VCM actuator may be configured to tilt the lens relative to the optical axis and/or relative to the image sensor.

In some cases, the VCM actuator may include a spring that connects the coil structure to a static member of the camera. For instance, the coil structure may be supported at least partly via the spring. The spring may include a first portion that is coupled to the base portion of the coil structure. Furthermore, the spring may include a plurality of channels that extend from the first portion to the static member.

In some examples, the spring may be formed of a metal substrate from which the coil structure is additively formed. In other examples, the coil structure may include one or more electrodes on the base portion, and the spring may be coupled to the base portion via the one or more electrodes. According to some embodiments, the spring may include one or more electrical traces configured to route current to the at least one coil to drive the coil. The spring may also include one or more insulator layers that electrically isolate the electrical traces. In some examples, the electrical traces and/or the insulator layers may be additively formed on the spring.

In some cases, the folded portion(s) of the coil structure may be additively formed together with the base portion of the coil structure. The additive layers may include a conductive material (e.g., copper) and an insulating material (e.g., polyimide).

In some embodiments, a voice coil motor (VCM) actuator may include a moveable member, a plurality of magnets (e.g., dual pole magnets), and a coil structure. The coil structure may include a base portion and folded portions. The base portion may be configured to attach to the moveable member. Furthermore, the base portion may be configured to surround at least a portion of the moveable member, e.g., along a first plane. The folded portions may individually include a respective coil of a plurality of coils. In some embodiments, each of the folded portions extends from the base portion in a folded arrangement such that current flows through the respective coil along a respective plane that is orthogonal to the first plane. Furthermore, in various embodiments, each of the plurality of coils may be formed of additive layers. In some embodiments one or more of the plurality of coils may be formed of additive layers and one or more other coils of the plurality of coils may be formed by a different process, such as wound coils separately attached to the coil structure. In some embodiments, the coil structure may include one or more coils formed of additive layers, and the VCM may include one or more other coils separately attached. In some examples, the VCM actuator may be configured to move the moveable member based at least in part on magnetic interaction between at least one of the plurality of coils and at least one of the plurality of magnets.

In some cases, the folded portions of the coil structure may include a first folded portion, a second folded portion, a third folded portion, and a fourth folded portion. For instance, the first folded portion may be to a first side of the moveable member and proximate a first magnet. The second folded portion may be to a second side of the moveable member and proximate a second magnet. Furthermore, the second folded portion may be opposite the first folded portion relative the moveable member. The third folded portion may be to a third side of the moveable member and proximate a third magnet. The fourth folded portion may be to a fourth side of the moveable member and proximate a fourth magnet. Furthermore, the fourth folded portion may be opposite the third folded portion relative to the moveable member.

In some examples, each of the folded portions of the coil structure may include a respective first straight portion, a respective second straight portion, and a respective intermediate portion. The first straight portion may extend in a first direction that is parallel to the plane along which the base portion of the coil structure is configured to surround the moveable member. The second straight portion may extend in a second direction orthogonal to the first direction. The respective intermediate portion may extend from the first straight portion to the second straight portion. In some embodiments, each respective coil may be formed on a respective second straight portion. Furthermore, the second straight portion may extend upwardly above the base portion in some cases.

In some embodiments, the coil structure may include a spring that connects the coil structure to a static member of the VCM actuator. For instance, the spring may connect the coil structure to the static member such that the coil structure is supported at least partly via the spring. The spring may include a first portion that is formed on the base portion of the coil structure. Furthermore, the spring may include a plurality of channels that extend from the first portion to the static member.

According to some examples, the folded portions of the coil structure may be additively formed together with the base portion of the coil structure. The additive layers may include a conductive material (e.g., copper) and an insulating material (e.g., polyimide).

According to various embodiments, the moveable member may be a lens carrier of a camera module. The lens carrier may be configured to hold a lens that defines an optical axis. In some instances, the VCM actuator may be configured to move the lens along the optical axis. Additionally, or alternatively, the VCM actuator may be configured to tilt the lens relative to the optical axis.

In some embodiments, a method of manufacturing a voice coil motor (VCM) actuator may include forming a flat coil structure that includes a plurality of actuator coils. For instance, the flat coil structure may be formed using an additive process. Furthermore, the method may include folding portions of the flat coil structure to form a folded coil structure. The folded coil structure may include a base portion and a plurality of folded portions extending from the base portion. The base portion may be configured to surround a perimeter of a lens carrier of a camera. Each of the folded portions may include a respective one of the actuator coils.

To form the flat coil structure using an additive process, the method may include coating a metal substrate (e.g., a copper alloy, stainless steel, etc.) with an insulator layer (e.g., liquid polyimide); exposing, using a lithographic process, one or more areas of the insulator layer; sputtering the exposed areas with a seed layer (e.g., copper); and forming a conductive layer (e.g., copper) by plating the seed layer.

In some implementations, as part of forming the flat coil structure, the method may include forming a spring. The spring may include a first portion on the base portion of the flat coil structure, and a plurality of channels that extend outwardly from the first portion. To form the spring, a first portion of the metal substrate may be etched away to leave a second portion of the metal substrate that includes (or forms) the spring. In other implementations, the spring may not be formed as part of forming the flat coil structure. That is, the spring may be formed separately. In such cases, the first portion of the spring may be coupled to the base portion of the coil structure via one or more electrodes formed on the base portion.

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

FIG. 1 illustrates a perspective view of an example camera module 100 that includes a voice coil motor (VCM) actuator with an additive coil structure, in accordance with some embodiments. In some embodiments, the camera module 100 may include one or multiple features, components, and/or functionality of embodiments described herein with reference to FIGS. 2-12.

In some embodiments, the camera module 100 may include a lens 102, an image sensor (e.g., the image sensor described below with reference to FIG. 9), and a VCM actuator. The lens 102 may define an optical axis 104. In various embodiments, the VCM actuator may include a lens carrier 106, one or more magnets 108 (e.g., dual pole magnets), and an additive coil structure 110. The lens carrier 106 may be configured to hold the lens 102. For instance, the lens 102 may be coupled to the lens carrier 106 such that the lens 102 moves together with the lens carrier 106.

In various examples, the additive coil structure 110 may include a base portion 112 and at least one folded portion 114. The base portion 112 may be attached to the lens carrier 106. Furthermore, the base portion 112 may surround a perimeter of the lens carrier 106. Each of the folded portions 114 may include a respective coil 116 (e.g., an autofocus coil). In some embodiments, each of the folded portions 114 may extend from the base portion 112 in a folded arrangement such that the respective coil 116 is located proximate a respective magnet 108. According to various embodiments, each of the coils 116 may be formed of additive layers (e.g., via an additive process).

In some embodiments, the VCM actuator may be configured to shift the lens 102, relative to the image sensor, based at least in part on magnetic interaction between the coils 116 and the magnets 108. In some instances, the VCM actuator may be configured to move the lens 102 along the optical axis 104 and/or in directions orthogonal to the image sensor. Additionally, or alternatively, the VCM actuator may be configured to tilt the lens 102 relative to the optical axis 104 and/or relative to the image sensor.

In some cases, the VCM actuator may include a spring 118 that connects the additive coil structure 110 to a static member 120 of the VCM actuator and/or of the camera module 100. For instance, the additive coil structure 110 may be supported at least partly via the spring 118. The connection between the spring 118 and the static 120 member may at least partially suspend the coil structure 110 relative to the static member 120. In some embodiments, the static member 120 may be static relative to coil structure 110 for one or more degrees of freedom, but may also be moveable with coil structure 110 in one or more other degrees of freedom with respect to another portion of camera module 100 (e.g., the coil structure, but not the static member, is moveable along the optical axis for autofocus, while the static member, the coil structure and lens carrier move together orthogonal to the optical axis for optical image stabilization).

Figure 2:
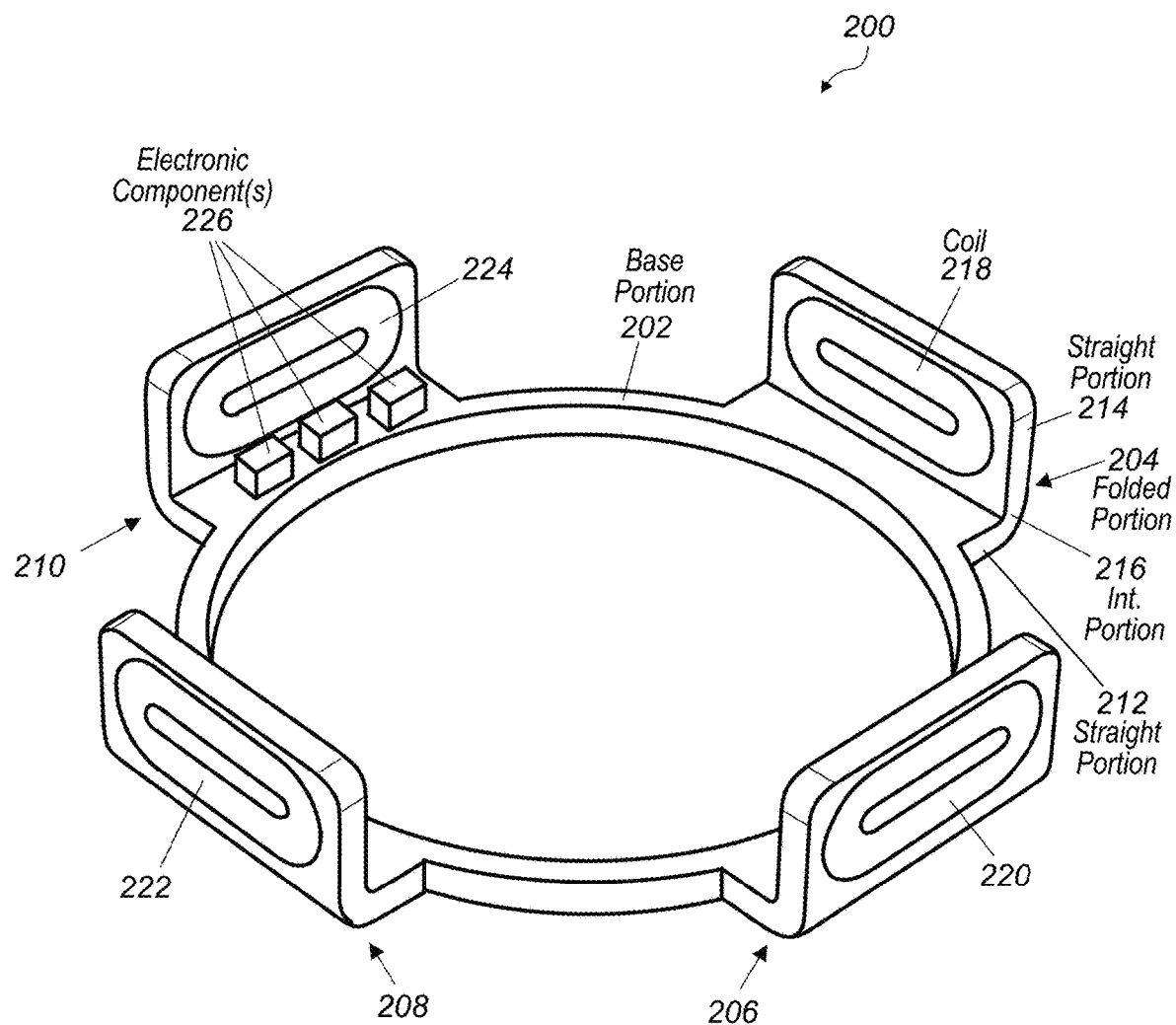
FIG. 2 illustrates a perspective view of an example additive coil structure of a voice coil motor (VCM) actuator, in accordance with some embodiments.

FIG. 2 illustrates a perspective view of an example additive coil structure 200 of a voice coil motor (VCM) actuator, in accordance with some embodiments. In some embodiments, the additive coil structure 200 may include one or multiple features, components, and/or functionality of embodiments described herein with reference to FIGS. 1 and 3A-12.

In some embodiments, the additive coil structure 200 may include a base portion 202 and multiple folded portions. The base portion 202 may be configured to be attached to attach to a moveable member of the VCM actuator. For instance, in some cases, the additive coil structure 200 may be part of a VCM actuator used in a camera module (e.g., the camera module 100 described above with reference to FIG. 1), and the moveable member may be a lens carrier configured to hold a lens of the camera module. In some embodiments, the base portion 202 may be configured to surround at least a portion of the lens carrier. For example, the base portion 202 may circumferentially surround a perimeter of the lens carrier along a first plane, where the first plane may be perpendicular to the optical axis.

In some examples, the folded portions of the additive coil structure 200 may include a first folded portion 204, a second folded portion 206, a third folded portion 208, and a fourth folded portion 210. Each of the folded portions may extend from the base portion 202 in a folded arrangement, e.g., as shown in FIG. 2. In some embodiments, each of the folded portions includes a respective first straight portion 212, a respective second straight portion 214, and a respective intermediate portion 216. The first straight portion 212 may extend in a first direction that is parallel to the plane along which the base portion 202 surrounds the lens carrier. The second straight portion 214 may extend in a second direction orthogonal to the first direction. The intermediate portion 216 may extend from the first straight portion 212 to the second straight portion 214. In some embodiments, each respective coil may be formed on a respective second straight portion 214. Furthermore, the second straight portion 214 may extend upwardly above the base portion 202 in some cases. It is understood, however, that the additive coil structure 200 may be formed and/or folded into any suitable shape.

The folded portions may individually include a respective coil. For example, the first folded portion 204 may include a first coil 218, the second folded portion 206 may include a second coil 220, the third folded portion 208 may include a third coil 222, and the fourth folded portion 210 may include a fourth coil 224. In some embodiments, each of the folded portions may extend from the base portion 202 in a folded arrangement such that current flows through the respective coil along a respective plane that is orthogonal to the plane along which the base portion 202 surrounds the lens carrier. In some embodiments, each of the coils may be individually driven. In other embodiments, one or more of the coils may be driven in series.

In some embodiments, each of the folded portions and their respective coil may be to a respective side of the lens carrier and proximate a respective magnet of the VCM actuator. For instance, the first folded portion 204 and the first coil 218 may be opposite third folded portion 208 and the third coil 222, relative to the lens carrier. Likewise, the second folded portion 206 and the second coil 220 may be opposite the fourth folded portion 210 and the fourth coil 224, relative to the lens carrier.

In various embodiments, the additive coil structure 200 may be formed of additive layers, e.g., using an additive process as described in further detail below with reference to FIGS. 3A-8. In some embodiments, electronic components 226 may also be additively formed on the additive coil structure 200. For instance, the electronic components 226 may be formed on the base portion 202 of the additive coil structure 200 in some embodiments. The electronic components 226 may include active components and/or passive components.

Figure 3B:
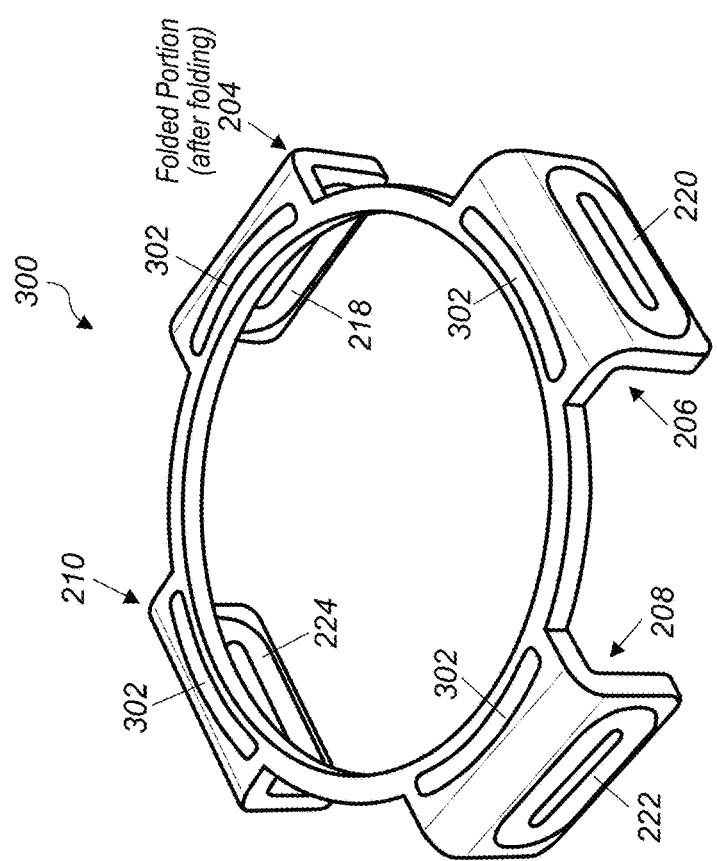
FIGS. 3A and 3B illustrate another example additive coil structure of a voice coil motor (VCM) actuator, in accordance with some embodiments.
Figure 3A:
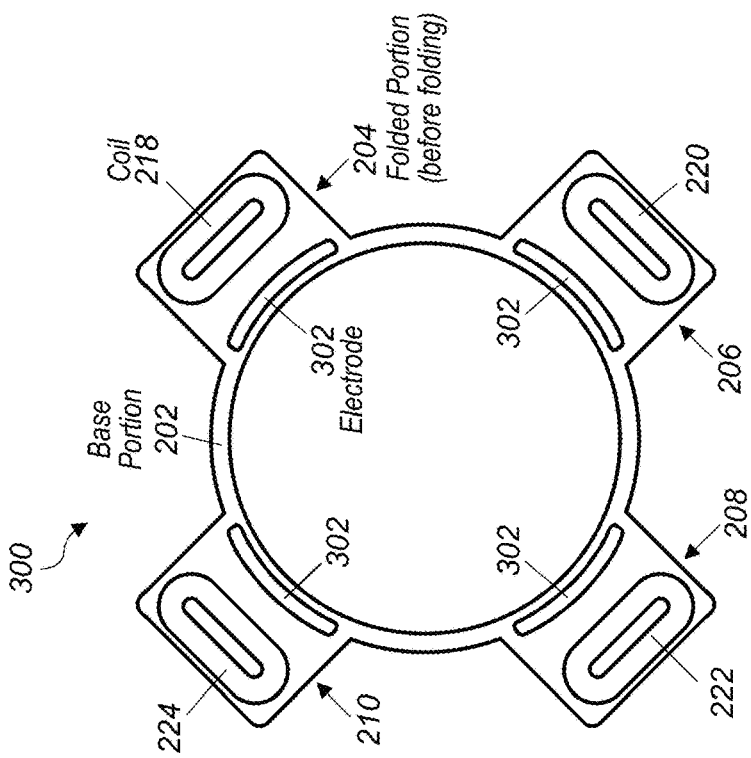

FIGS. 3A and 3B illustrate another example additive coil structure 300 of a voice coil motor (VCM) actuator, in accordance with some embodiments. FIG. 3A illustrates a bottom view of the additive coil structure 300 in a flat state. FIG. 3B illustrates a perspective view of the additive coil structure 300 in a folded state. In some embodiments, the additive coil structure 300 may include one or multiple features, components, and/or functionality of embodiments described herein with reference to FIGS. 1, 2, and 4A-12.

In some embodiments, the additive coil structure 300 may include one or multiple electrodes 302. For example, the electrodes 302 may be formed on the base portion 202 and/or the folded portions of the additive coil structure 300. As shown in FIGS. 3A and 3B, in some embodiments, a respective electrode 302 may be formed on a bottom side of each of the folded portions, e.g., proximate a bottom side of the base portion 202 of the additive coil structure 300.

In various examples, the electrodes 302 may allow for a spring (e.g., the spring 118 described above with reference to FIG. 1) to be coupled to the additive coil structure 300. For instance, the spring may be coupled to the additive coil structure 300 via the electrodes 302. In various embodiments, the spring may include a first portion that is attached to the electrodes 302 and one or multiple channels extending from the first portion. For example, electrodes 302 may provide a location to solder or otherwise attach one or more springs to the additive coil structure 300. In some examples, the spring that is coupled to the additive coil structure 300 may be similar to the spring 402 described below with reference to FIGS. 4A and 4B. However, the spring that is coupled to the additive coil structure 300 may be formed separately from the additive coil structure 300, whereas the spring 402 in FIGS. 4A and 4B is formed together with the additive coil structure 400. An electrode 302 may provide a conduct path for one or more electrical signals transmitted via the spring to a corresponding coil, e.g., to drive a current through the coil. In some embodiments, separate individual springs may be attached to the additive coil structure 300, e.g. four discrete spring members attached to four respective electrodes. In other embodiment, the springs may be formed from a common metallic substrate for mechanical integrity. Individual spring members attached to respective electrodes may carry one or more signal traces to conduct respective electrical signals to the individual coils so that electrical signals may be provided independently to different ones of the coils. See, e.g., FIG. 6.

FIGS. 4A and 4B illustrate yet another example additive coil structure 400 of a voice coil motor (VCM) actuator, in accordance with some embodiments. In FIGS. 4A and 4B, the additive coil structure 400 may include a spring that is formed together with the additive coil structure. FIG. 4A illustrates a bottom view of the additive coil structure 400 in a flat state. FIG. 4B illustrates a perspective view of the additive coil structure 400 in a folded state. In some embodiments, the additive coil structure 400 may include one or multiple features, components, and/or functionality of embodiments described herein with reference to FIGS. 1-3B and 5-12.

According to various embodiments, the additive coil structure 400 may include a spring 402. In some examples, the spring 402 may be formed together with the additive coil structure 400, e.g., as part of a same additive process as discussed below with reference to FIGS. 7 and 8.

The spring 402 may connect the additive coil structure 400 to a static member (e.g., of a camera) such that the additive coil structure 400 is supported at least partly via the spring 402. The spring 402 may include a first portion 404 and one or multiple channels 406. The first portion 404 of the spring 402 may be formed on the base portion 202 of the additive coil structure 400, e.g., at a bottom side of the base portion 202. The channels 406 may extend outwardly from the first portion 404. For instance, the channels 406 may extend from the first portion 404 to the static member. In various embodiments, the spring 402 may be formed, at least in part, of a metal substrate that is used in an additive process to form part or all of the additive coil structure 400.

Figure 5:
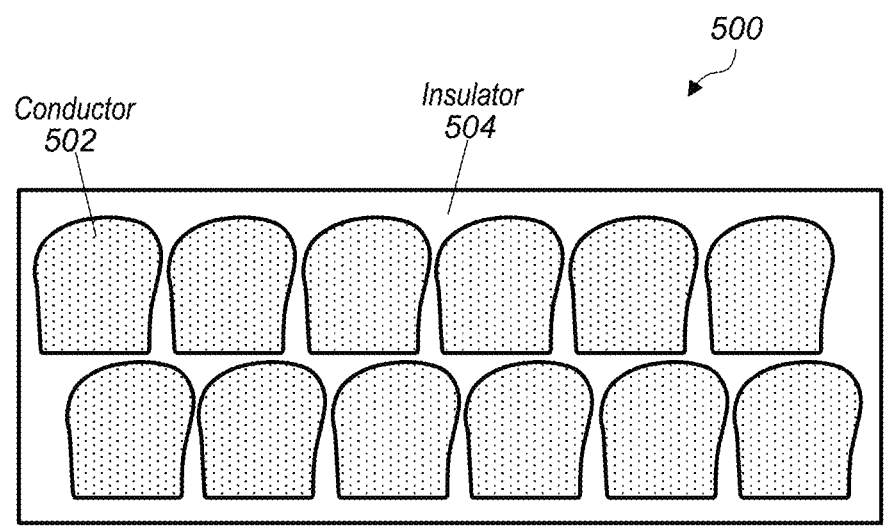
FIG. 5 illustrates a cross-sectional view of a portion of an example additive coil of a voice coil motor (VCM) actuator, in accordance with some embodiments.

FIG. 5 illustrates a cross-sectional view of a portion of an example additive coil 500 of a voice coil motor (VCM) actuator, in accordance with some embodiments. In some embodiments, the additive coil 500 may include one or multiple features, components, and/or functionality of embodiments described herein with reference to FIGS. 1-4B and 6-12. In some embodiments, the cross-sectional view of the additive coil 500 is a cross-section taken, e.g., along section line 5-5 shown in FIG. 4B. The additive coil 500 may include additive layers of a conductor (e.g., copper) and an insulator (e.g., polyimide).

Figure 6:
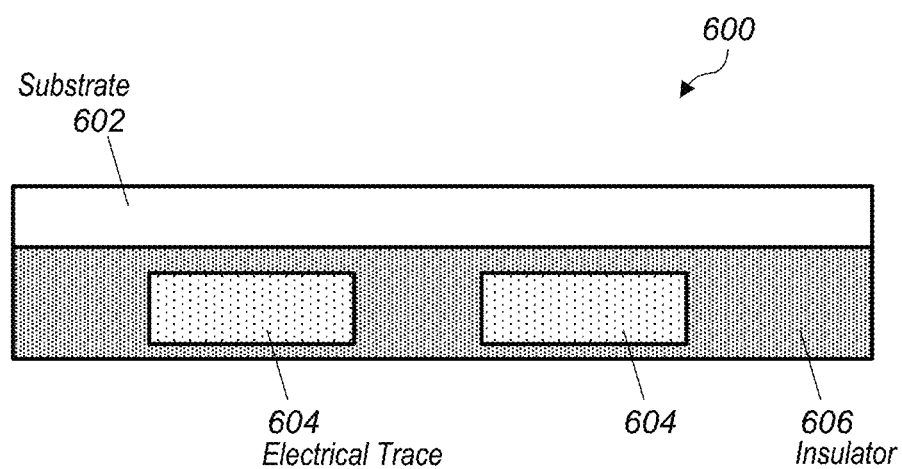
FIG. 6 illustrates a cross-sectional view of a portion of an example spring of a voice coil motor (VCM) actuator, in accordance with some embodiments.

FIG. 6 illustrates a cross-sectional view of a portion of an example spring 600 of a voice coil motor (VCM) actuator, in accordance with some embodiments. In some embodiments, the spring 600 may include one or multiple features, components, and/or functionality of embodiments described herein with reference to FIGS. 1-5 and 7-12.

In some embodiments, the cross-sectional view of the spring 600 is cross-section taken, e.g., along section line 6-6 shown in FIG. 4B. The spring 600 may be formed together with an additive coil structure, e.g., as discussed above with reference to FIGS. 4A and 4B. Furthermore, as discussed below with reference to FIGS. 7 and 8, the spring 600 may be formed, at least in part, of a substrate 602 (e.g., a metal substrate) that is used in an additive process to form part or all of the additive coil structure.

According to some embodiments, the spring 600 may include one or more electrical traces 604 configured to route current to the coils to drive the coils. The spring 600 may also include one or more insulator layers 606 that electrically isolate the electrical traces 604. In some examples, the electrical traces 604 and/or the insulator layers 606 may be additively formed on the spring 600.

Figure 7:
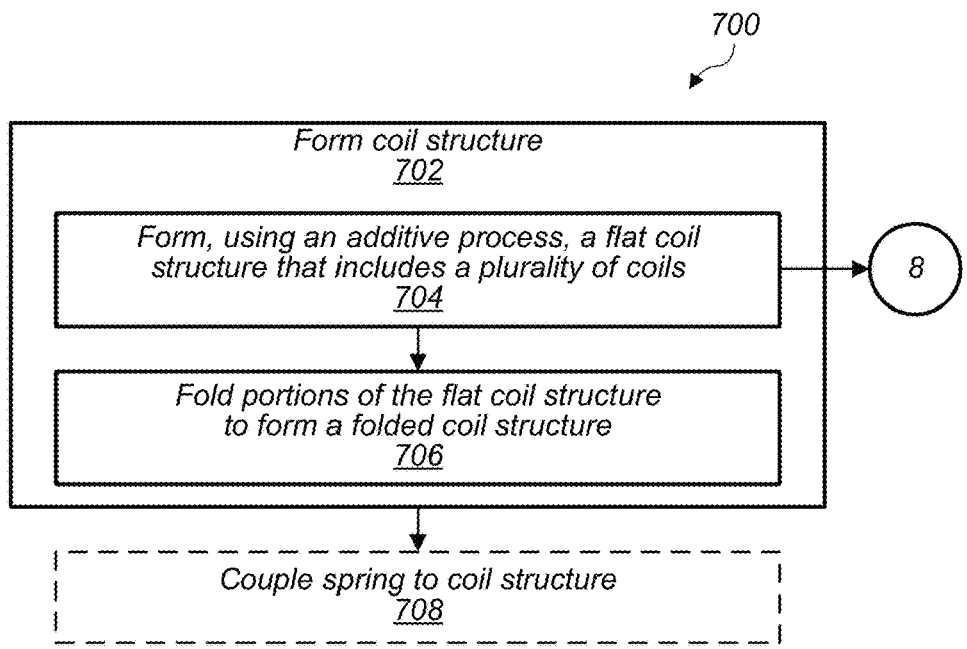
FIG. 7 is a flowchart of an example method of manufacturing a voice coil motor (VCM) actuator that includes an additive coil structure, in accordance with some embodiments.

FIG. 7 is a flowchart of an example method 700 of manufacturing a voice coil motor (VCM) actuator that includes an additive coil structure, in accordance with some embodiments. In some embodiments, the method 700 may include one or multiple features, components, and/or functionality of embodiments described herein with reference to FIGS. 1-6 and 8-12.

At 702, the method 700 may include forming an additive coil structure. As part of forming the additive coil structure, the method 700 may include, at 704, forming a flat coil structure that includes a plurality of coils. For instance, the flat coil structure may be formed using an additive process, e.g., as discussed in further detail below with reference to FIG. 8. Furthermore, as part of forming the additive coil structure, the method 700 may include, at 706, folding portions of the flat coil structure to form a folded coil structure. At 708, the method 700 may include coupling a spring to the additive coil structure. In other implementations, instead of coupling a separately formed spring to the additive coil structure, a spring may be formed together with the additive coil structure as part of a same additive process, e.g., as discussed in further detail below with reference to FIG. 8.

Figure 8:
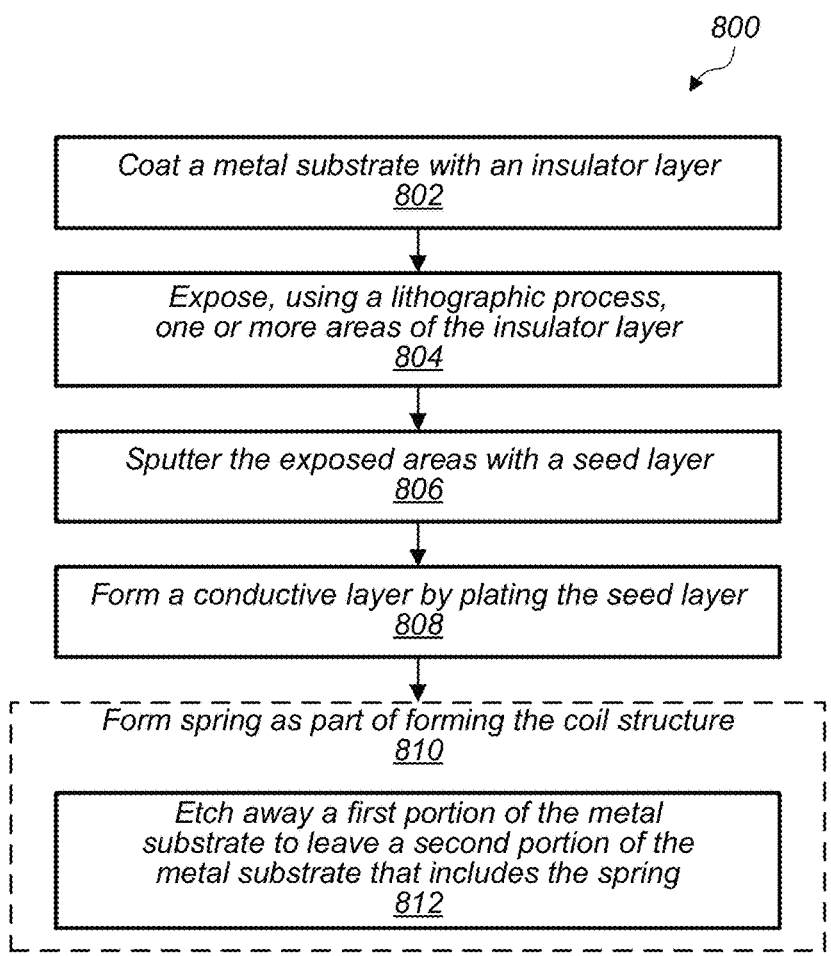
FIG. 8 is a flowchart of another example method of manufacturing a voice coil motor (VCM) actuator that includes an additive coil structure, in accordance with some embodiments.

FIG. 8 is a flowchart of another example method 800 of manufacturing a voice coil motor (VCM) actuator that includes an additive coil structure, in accordance with some embodiments. In some embodiments, the method 800 may include one or multiple features, components, and/or functionality of embodiments described herein with reference to FIGS. 1-7 and 9-12.

At 802, the method 800 may include coating a metal substrate with an insulator layer. At 804, the method 800 may include exposing, using a lithographic process, one or more areas of the insulator layer. At 806, the method 800 may include sputtering the exposed areas with a seed layer. At 808, the method 800 may include forming a conductive layer by plating the seed layer. At 810, the method 800 may include forming a spring as part of forming the additive coil structure. To form the spring, the method 800 may include, at 812, etching away a first portion of the metal substrate to leave a second portion of the metal substrate that includes (or forms) the spring. In some embodiments, the spring may be separately formed and coupled to the additive coil structure instead of being formed as part of forming the additive coil structure, e.g., as discussed above with reference to FIG. 7.

Figure 9:
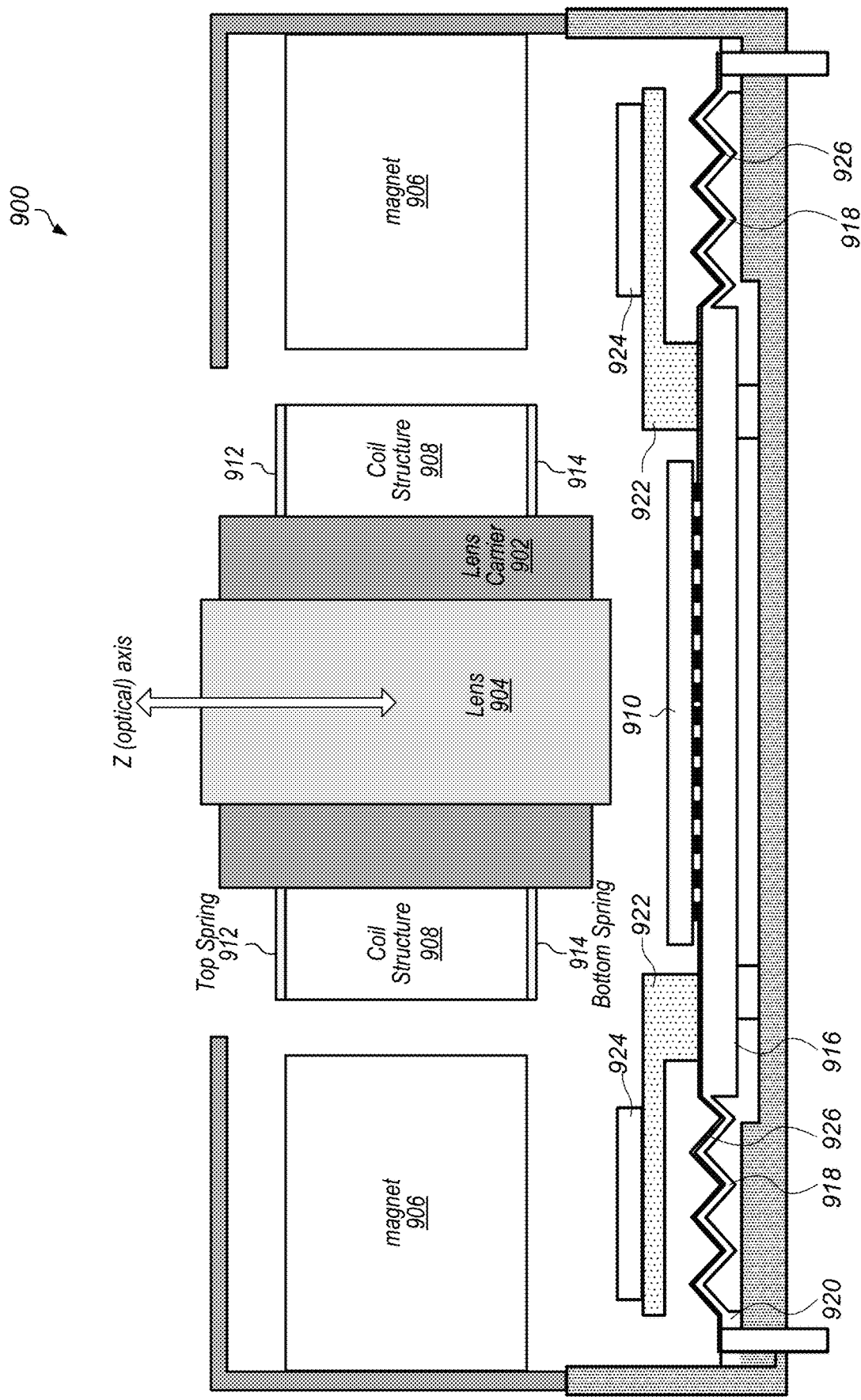
FIG. 9 illustrates a schematic side view of an example voice coil motor (VCM) actuator module included in a camera and configured to shift the lens and/or the image sensor along one or multiple axes, in accordance with some embodiments.

FIG. 9 illustrates a schematic side view of an example voice coil motor (VCM) actuator module 900 included in a camera and configured to shift the lens and/or the image sensor along one or multiple axes, in accordance with some embodiments. In some embodiments, the VCM actuator module 900 may include one or multiple features, components, and/or functionality of embodiments described herein with reference to FIGS. 1-8 and 10-12.

In some embodiments, the VCM actuator module 900 may include a lens carrier 902 configured to accommodate a lens 904, magnets 906, and an additive coil structure 908. The additive coil structure 908 includes coils (e.g., autofocus coils) located proximate the magnet 906. The coils of the additive coil structure 908 may magnetically interact with the magnets 906 to produce Lorentz forces that cause the lens carrier 902 to shift in one or multiple directions. The lens 904 may shift together with the lens carrier 902. In some embodiments, interaction between the coils of the additive coil structure 908 and the magnets 906 may cause the lens 904 to move along the optical axis (and/or orthogonal to the image sensor 910) and/or to tilt relative to the optical axis (and/or relative to the image sensor 910).

In some embodiments, the VCM actuator module 900 may include a top spring 912 and/or a bottom spring 914. The top spring 912 and/or the bottom spring 914 may couple the additive coil structure 908 with one or more other components (e.g., one or more static members). In some examples, the top spring 912 and/or the bottom spring 914 may be additively formed together with the additive coil structure 908. In other examples, the top spring 912 and/or the bottom spring 914 may be separately formed and coupled to the additive coil structure 908.

In some examples, the VCM actuator module 900 may include a dynamic platform 916 configured to hold the image sensor 910. One or more sets of flexures 918 may mechanically connect the sensor shift platform 916 to a static platform 920. The dynamic platform 916 may include coil holders 922 configured to hold coils 924 (e.g., optical image stabilization coils) proximate the magnets 906 (or other actuator magnets). The coils 924 may magnetically interact with the magnets 906 to produce Lorentz forces that cause the dynamic platform 916 to shift in one or more directions. The image sensor 910 may shift together with the dynamic platform 916. The flexures 918 may provide compliance for movement of the dynamic platform 916. In some embodiments, interaction between the coils 924 and the magnets 906 may cause the image sensor 910 to shift, relative to the lens 904, in directions orthogonal to the optical axis.

In some embodiments, the flexures 918 may include electrical traces 926 configured to route image signals from the image sensor 910 to the static platform 920. Furthermore, the static platform 920 may be configured to route the image signals to a flex (not shown). Additionally, the electrical traces 926 may be configured to route current to the coils 924 to drive the coils 924.

Multifunction Device Examples

Figure 10:
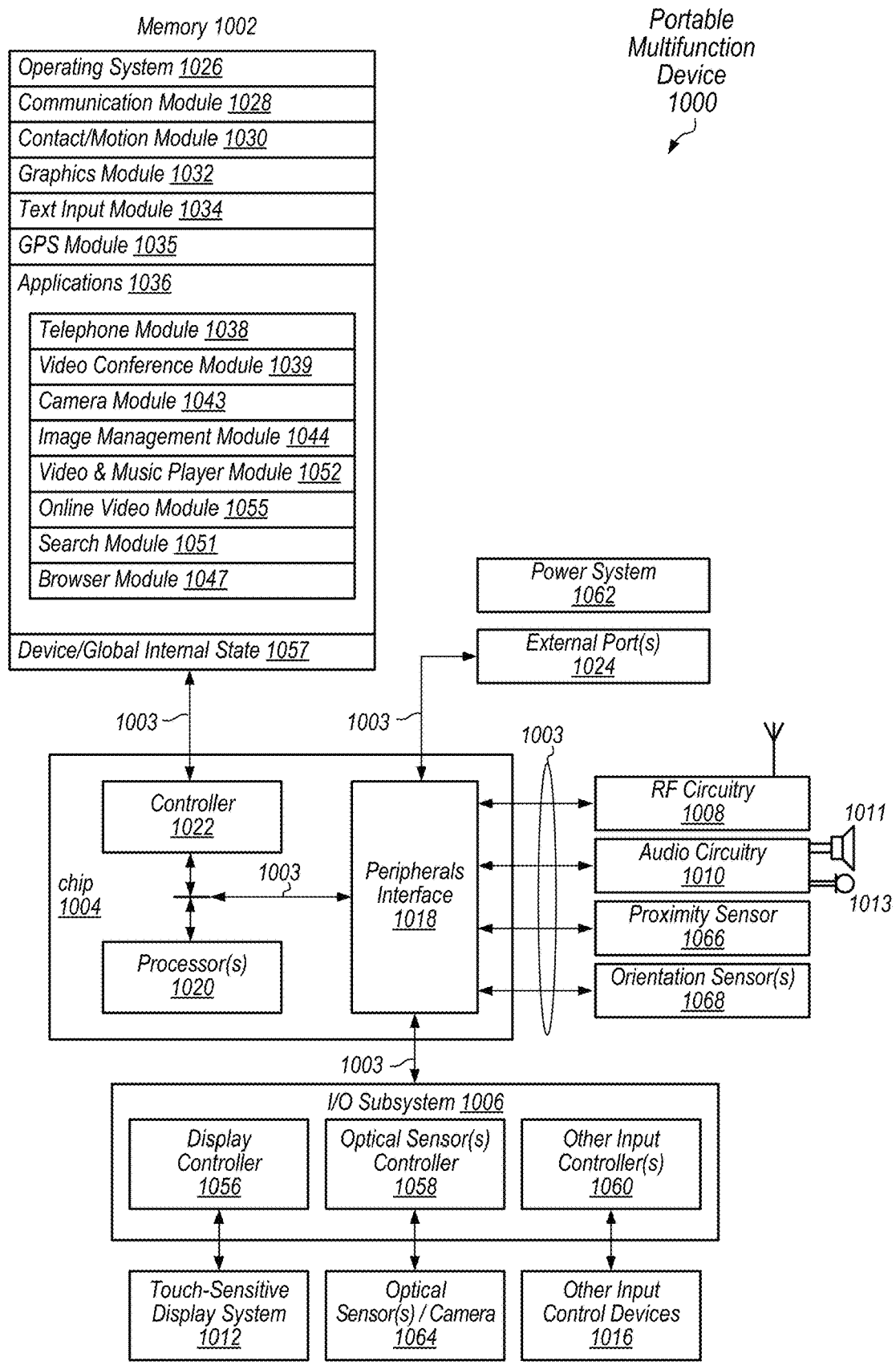
FIG. 10 illustrates a block diagram of a portable multifunction device with a camera, in accordance with some embodiments.

FIG. 10 illustrates a block diagram of a portable multifunction device 1000, in accordance with some embodiments. In some embodiments, the portable multifunction device 1000 may include one or multiple features, components, and/or implement functionality of embodiments described herein with reference to FIGS. 1-9, 11, and 12.

In some embodiments, the device 1000 is a portable communications device, such as a mobile telephone, that also contains other functions, such as PDA, camera, video capture and/or playback, and/or music player functions. Example embodiments of portable multifunction devices include, without limitation, the iPhone®, iPod Touch®, and iPad® devices from Apple Inc. of Cupertino, Calif. Other portable electronic devices, such as laptops, cell phones, smartphones, pad or tablet computers with touch-sensitive surfaces (e.g., touch screen displays and/or touch pads), may also be used. It should also be understood that, in some embodiments, the device is not a portable communications device, but is a desktop computer with a touch-sensitive surface (e.g., a touch screen display and/or a touch pad). In some embodiments, the device is a gaming computer with orientation sensors (e.g., orientation sensors in a gaming controller). In other embodiments, the device is not a portable communications device, but is a camera and/or video camera.

In the discussion that follows, an electronic device that includes a display and a touch-sensitive surface is described. It should be understood, however, that the electronic device may include one or more other physical user-interface devices, such as a physical keyboard, a mouse and/or a joystick.

The device 1000 typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, a streaming video application, and/or a digital video player application.

The various applications that may be executed on the device 1000 may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

Device 1000 may include memory 1002 (which may include one or more computer readable storage mediums), memory controller 1022, one or more processing units (CPU's) 1020, peripherals interface 1018, RF circuitry 1008, audio circuitry 1010, speaker 1011, touch-sensitive display system 1012, microphone 1013, input/output (I/O) subsystem 1006, other input control devices 1016, and external port 1024. Device 1000 may include one or more optical sensors or cameras 1064 (e.g., one or more embodiments of the cameras described herein). These components may communicate over one or more communication buses or signal lines 1003.

It should be appreciated that device 1000 is only one example of a portable multifunction device, and that device 1000 may have more or fewer components than shown, may combine two or more components, or may have a different configuration or arrangement of the components. The various components shown in FIG. 10 may be implemented in hardware, software, or a combination of hardware and software, including one or more signal processing and/or application specific integrated circuits.

Memory 1002 may include high-speed random access memory and may also include non-volatile memory, such as one or more magnetic disk storage devices, flash memory devices, or other non-volatile solid-state memory devices. Access to memory 1002 by other components of device 1000, such as CPU 1020 and the peripherals interface 1018, may be controlled by memory controller 1022.

Peripherals interface 1018 can be used to couple input and output peripherals of the device to CPU 1020 and memory 1002. The one or more processors 1020 run or execute various software programs and/or sets of instructions stored in memory 1002 to perform various functions for device 1000 and to process data.

In some embodiments, peripherals interface 1018, CPU 1020, and memory controller 1022 may be implemented on a single chip, such as chip 1004. In some other embodiments, they may be implemented on separate chips.

RF (radio frequency) circuitry 1008 receives and sends RF signals, also called electromagnetic signals. RF circuitry 1008 converts electrical signals to/from electromagnetic signals and communicates with communications networks and other communications devices via the electromagnetic signals. RF circuitry 1008 may include well-known circuitry for performing these functions, including but not limited to an antenna system, an RF transceiver, one or more amplifiers, a tuner, one or more oscillators, a digital signal processor, a coder/decoder (codec) chipset, a subscriber identity module (SIM) card, memory, and so forth. RF circuitry 1008 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a variety of communications standards, protocols and technologies, including but not limited to Global System for Mobile Communications (GSM), Enhanced Data GSM Environment (EDGE), high-speed downlink packet access (HSDPA), high-speed uplink packet access (HSUPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 1010, speaker 1011, and microphone 1013 provide an audio interface between a user and device 1000. Audio circuitry 1010 receives audio data from peripherals interface 1018, converts the audio data to an electrical signal, and transmits the electrical signal to speaker 1011. Speaker 1011 converts the electrical signal to audible sound waves. Audio circuitry 1010 also receives electrical signals converted by microphone 1013 from sound waves. Audio circuitry 1010 converts the electrical signal to audio data and transmits the audio data to peripherals interface 1018 for processing. Audio data may be retrieved from and/or transmitted to memory 1002 and/or RF circuitry 1008 by peripherals interface 1018. In some embodiments, audio circuitry 1010 also includes a headset jack. The headset jack provides an interface between audio circuitry 1010 and removable audio input/output peripherals, such as output-only headphones or a headset with both output (e.g., a headphone for one or both ears) and input (e.g., a microphone).

I/O subsystem 1006 couples input/output peripherals on device 1000, such as touch screen 1012 and other input control devices 1016, to peripherals interface 1018. I/O subsystem 1006 may include display controller 1056 and one or more input controllers 1060 for other input control devices 1016. The one or more input controllers 1060 receive/send electrical signals from/to other input control devices 1016. The other input control devices 1016 may include physical buttons (e.g., push buttons, rocker buttons, etc.), dials, slider switches, joysticks, click wheels, and so forth. In some alternative embodiments, input controller(s) 1060 may be coupled to any (or none) of the following: a keyboard, infrared port, USB port, and a pointer device such as a mouse. The one or more buttons may include an up/down button for volume control of speaker 1011 and/or microphone 1013. The one or more buttons may include a push button.

Touch-sensitive display 1012 provides an input interface and an output interface between the device and a user. Display controller 1056 receives and/or sends electrical signals from/to touch screen 1012. Touch screen 1012 displays visual output to the user. The visual output may include graphics, text, icons, video, and any combination thereof (collectively termed "graphics"). In some embodiments, some or all of the visual output may correspond to user-interface objects.

Touch screen 1012 has a touch-sensitive surface, sensor or set of sensors that accepts input from the user based on haptic and/or tactile contact. Touch screen 1012 and display controller 1056 (along with any associated modules and/or sets of instructions in memory 1002) detect contact (and any movement or breaking of the contact) on touch screen 1012 and converts the detected contact into interaction with user-interface objects (e.g., one or more soft keys, icons, web pages or images) that are displayed on touch screen 1012. In an example embodiment, a point of contact between touch screen 1012 and the user corresponds to a finger of the user.

Touch screen 1012 may use LCD (liquid crystal display) technology, LPD (light emitting polymer display) technology, or LED (light emitting diode) technology, although other display technologies may be used in other embodiments. Touch screen 1012 and display controller 1056 may detect contact and any movement or breaking thereof using any of a variety of touch sensing technologies now known or later developed, including but not limited to capacitive, resistive, infrared, and surface acoustic wave technologies, as well as other proximity sensor arrays or other elements for determining one or more points of contact with touch screen 1012. In an example embodiment, projected mutual capacitance sensing technology is used, such as that found in the iPhone®, iPod Touch®, and iPad® from Apple Inc. of Cupertino, Calif.

Touch screen 1012 may have a video resolution in excess of 100 dpi. In some embodiments, the touch screen has a video resolution of approximately 160 dpi. The user may make contact with touch screen 1012 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen 1012, device 1000 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 1012 or an extension of the touch-sensitive surface formed by the touch screen.

Device 1000 also includes power system 1062 for powering the various components. Power system 1062 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 1000 may also include one or more optical sensors or cameras 1064. FIG. 10 shows an optical sensor coupled to optical sensor controller 1058 in I/O subsystem 1006. Optical sensor 1064 may, for example, include charge-coupled device (CCD) or complementary metal-oxide semiconductor (CMOS) phototransistors or photosensors. Optical sensor 1064 receives light from the environment, projected through one or more lenses, and converts the light to data representing an image. In conjunction with imaging module 1043 (also called a camera module), optical sensor 1064 may capture still images and/or video sequences. In some embodiments, at least one optical sensor may be located on the back of device 1000, opposite touch screen display 1012 on the front of the device. In some embodiments, the touch screen display may be used as a viewfinder for still and/or video image acquisition. In some embodiments, at least one optical sensor may instead or also be located on the front of the device.

Device 1000 may also include one or more proximity sensors 1066. FIG. 10 shows proximity sensor 1066 coupled to peripherals interface 1018. Alternatively, proximity sensor 1066 may be coupled to input controller 1060 in I/O subsystem 1006. In some embodiments, the proximity sensor turns off and disables touch screen 1012 when the multifunction device is placed near the user's ear (e.g., when the user is making a phone call).

Device 1000 may also include one or more orientation sensors 1068. In some embodiments, the one or more orientation sensors include one or more accelerometers (e.g., one or more linear accelerometers and/or one or more rotational accelerometers). In some embodiments, the one or more orientation sensors include one or more gyroscopes. In some embodiments, the one or more orientation sensors include one or more magnetometers. In some embodiments, the one or more orientation sensors include one or more of global positioning system (GPS), Global Navigation Satellite System (GLONASS), and/or other global navigation system receivers. The GPS, GLONASS, and/or other global navigation system receivers may be used for obtaining information concerning the location and orientation (e.g., portrait or landscape) of device 1000. In some embodiments, the one or more orientation sensors include any combination of orientation/rotation sensors. FIG. 10 shows the one or more orientation sensors 1068 coupled to peripherals interface 1018. Alternatively, the one or more orientation sensors 1068 may be coupled to an input controller 1060 in I/O subsystem 1006. In some embodiments, information is displayed on the touch screen display in a portrait view or a landscape view based on an analysis of data received from the one or more orientation sensors.

In some embodiments, device 1000 may also include one or more other sensors (not shown) including but not limited to ambient light sensors and motion detectors. These sensors may be coupled to peripherals interface 1018 or, alternatively, may be coupled to an input controller 1060 in I/O subsystem 1006. For example, in some embodiments, device 1000 may include at least one forward-facing (away from the user) and at least one backward-facing (towards the user) light sensors that may be used to collect ambient lighting metrics from the environment of the device 1000 for use in video and image capture, processing, and display applications.

In some embodiments, the software components stored in memory 1002 include operating system 1026, communication module 1028, contact/motion module (or set of instructions) 1030, graphics module 1032, text input module 1034, Global Positioning System (GPS) module 1035, and applications 1036. Furthermore, in some embodiments memory 1002 stores device/global internal state 1057. Device/global internal state 1057 includes one or more of: active application state, indicating which applications, if any, are currently active; display state, indicating what applications, views or other information occupy various regions of touch screen display 1012; sensor state, including information obtained from the device's various sensors and input control devices 1016; and location information concerning the device's location and/or attitude.

Operating system 1026 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 1028 facilitates communication with other devices over one or more external ports 1024 and also includes various software components for handling data received by RF circuitry 1008 and/or external port 1024. External port 1024 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 1030 may detect contact with touch screen 1012 (in conjunction with display controller 1056) and other touch sensitive devices (e.g., a touchpad or physical click wheel). Contact/motion module 1030 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 1030 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multi-touch"/multiple finger contacts). In some embodiments, contact/motion module 1030 and di splay controller 1056 detect contact on a touchpad.

Contact/motion module 1030 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 1032 includes various software components for rendering and displaying graphics on touch screen 1012 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 1032 stores data representing graphics to be used. Each graphic may be assigned a corresponding code. Graphics module 1032 receives, from applications etc., one or more codes specifying graphics to be displayed along with, if necessary, coordinate data and other graphic property data, and then generates screen image data to output to display controller 1056.

Text input module 1034, which may be a component of graphics module 1032, provides soft keyboards for entering text in various applications that need text input.

GPS module 1035 determines the location of the device and provides this information for use in various applications (e.g., to telephone module 1038 for use in location-based dialing, to camera module 1043 as picture/video metadata, and to applications that provide location-based services such as map/navigation applications).

Applications 1036 may include one or more of, but are not limited to, the following modules (or sets of instructions), or a subset or superset thereof:

telephone module 1038;
 video conferencing module 1039;
 camera module 1043 for still and/or video imaging;
 image management module 1044;
 browser module 1047;
 search module 1051;
 video and music player module 1052, which may be made up of a video player module and a music player module; and/or
 online video module 1055.
 one or more other modules not shown, such as a gaming module.

Examples of other applications 1036 that may be stored in memory 1002 include but are not limited to other word processing applications, other image editing applications, drawing applications, presentation applications, communication/social media applications, map applications, JAVA-enabled applications, encryption, digital rights management, voice recognition, and voice replication.

In conjunction with RF circuitry 1008, audio circuitry 1010, speaker 1011, microphone 1013, touch screen 1012, display controller 1056, contact module 1030, graphics module 1032, and text input module 1034, telephone module 1038 may be used to enter a sequence of characters corresponding to a telephone number, access one or more telephone numbers in an address book, modify a telephone number that has been entered, dial a respective telephone number, conduct a conversation and disconnect or hang up when the conversation is completed. As noted above, the wireless communication may use any of a variety of communications standards, protocols and technologies.

In conjunction with RF circuitry 1008, audio circuitry 1010, speaker 1011, microphone 1013, touch screen 1012, display controller 1056, optical sensor 1064, optical sensor controller 1058, contact/motion module 1030, graphics module 1032, text input module 1034, and telephone module 1038, videoconferencing module 1039 includes executable instructions to initiate, conduct, and terminate a video conference between a user and one or more other participants in accordance with user instructions.

In conjunction with touch screen 1012, display controller 1056, optical sensor(s) 1064, optical sensor controller 1058, contact/motion module 1030, graphics module 1032, and image management module 1044, camera module 1043 includes executable instructions to capture still images or video (including a video stream) and store them into memory 1002, modify characteristics of a still image or video, or delete a still image or video from memory 1002.

In conjunction with touch screen 1012, display controller 1056, contact/motion module 1030, graphics module 1032, text input module 1034, and camera module 1043, image management module 1044 includes executable instructions to arrange, modify (e.g., edit), or otherwise manipulate, label, delete, present (e.g., in a digital slide show or album), and store still and/or video images.

In conjunction with RF circuitry 1008, touch screen 1012, display system controller 1056, contact/motion module 1030, graphics module 1032, and text input module 1034, browser module 1047 includes executable instructions to browse the Internet in accordance with user instructions, including searching, linking to, receiving, and displaying web pages or portions thereof, as well as attachments and other files linked to web pages.

In conjunction with touch screen 1012, display system controller 1056, contact/motion module 1030, graphics module 1032, and text input module 1034, search module 1051 includes executable instructions to search for text, music, sound, image, video, and/or other files in memory 1002 that match one or more search criteria (e.g., one or more user-specified search terms) in accordance with user instructions.

In conjunction with touch screen 1012, display system controller 1056, contact/motion module 1030, graphics module 1032, audio circuitry 1010, speaker 1011, RF circuitry 1008, and browser module 1047, video and music player module 1052 includes executable instructions that allow the user to download and play back recorded music and other sound files stored in one or more file formats, such as MP3 or AAC files, and executable instructions to display, present or otherwise play back videos (e.g., on touch screen 1012 or on an external, connected display via external port 1024). In some embodiments, device 1000 may include the functionality of an MP3 player, such as an iPod (trademark of Apple Inc.).

In conjunction with touch screen 1012, display system controller 1056, contact/motion module 1030, graphics module 1032, audio circuitry 1010, speaker 1011, RF circuitry 1008, text input module 1034, and browser module 1047, online video module 1055 includes instructions that allow the user to access, browse, receive (e.g., by streaming and/or download), play back (e.g., on the touch screen or on an external, connected display via external port 1024), and otherwise manage online videos in one or more video formats, such as the H.264/AVC format or the H.265/HEVC format.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise rearranged in various embodiments. In some embodiments, memory 1002 may store a subset of the modules and data structures identified above. Furthermore, memory 1002 may store additional modules and data structures not described above.

In some embodiments, device 1000 is a device where operation of a predefined set of functions on the device is performed exclusively through a touch screen and/or a touchpad. By using a touch screen and/or a touchpad as the primary input control device for operation of device 1000, the number of physical input control devices (such as push buttons, dials, and the like) on device 1000 may be reduced.

The predefined set of functions that may be performed exclusively through a touch screen and/or a touchpad include navigation between user interfaces. In some embodiments, the touchpad, when touched by the user, navigates device 1000 to a main, home, or root menu from any user interface that may be displayed on device 1000. In such embodiments, the touchpad may be referred to as a "menu button." In some other embodiments, the menu button may be a physical push button or other physical input control device instead of a touchpad.

Figure 11:
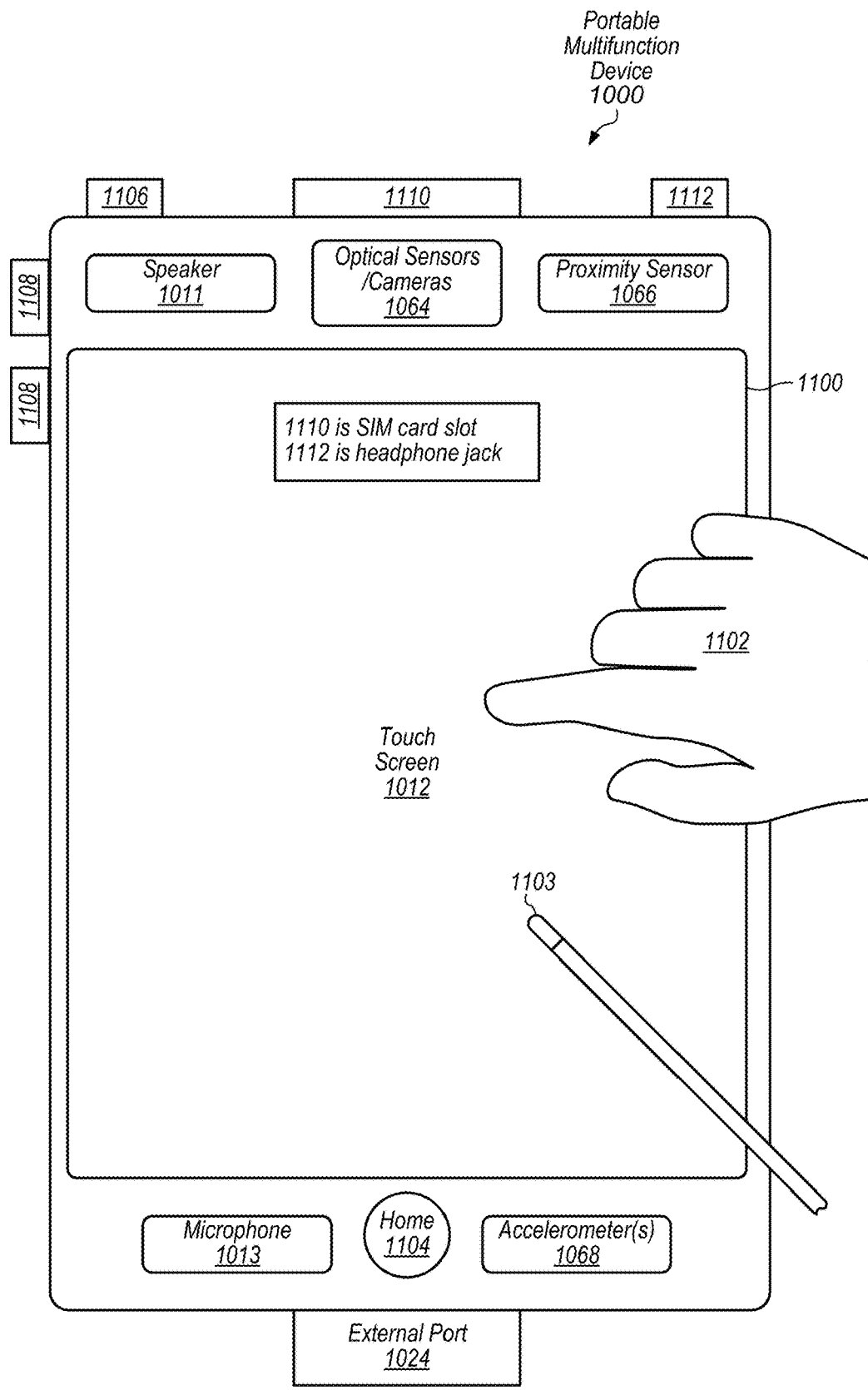
FIG. 11 depicts a portable multifunction device having a camera, in accordance with some embodiments.

FIG. 11 depicts illustrates an example portable multifunction device 1000 that may include one or more cameras, in accordance with some embodiments. In some embodiments, the portable multifunction device 1000 may include one or multiple features, components, and/or functionality of embodiments described herein with reference to FIGS. 1-10 and 12.

The device 1000 may have a touch screen 1012. The touch screen 1012 may display one or more graphics within user interface (UI) 1100. In this embodiment, as well as others described below, a user may select one or more of the graphics by making a gesture on the graphics, for example, with one or more fingers 1102 (not drawn to scale in the figure) or one or more styluses 1103 (not drawn to scale in the figure).

Device 1000 may also include one or more physical buttons, such as "home" or menu button 1004. As described previously, menu button 1104 may be used to navigate to any application 1036 in a set of applications that may be executed on device 1000. Alternatively, in some embodiments, the menu button 1104 is implemented as a soft key in a GUI displayed on touch screen 1012.

In one embodiment, device 1000 includes touch screen 1012, menu button 1104, push button 1106 for powering the device on/off and locking the device, volume adjustment button(s) 1108, Subscriber Identity Module (SIM) card slot 1110, head set jack 1112, and docking/charging external port 1024. Push button 1106 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 1000 also may accept verbal input for activation or deactivation of some functions through microphone 1013.

It should be noted that, although many of the examples herein are given with reference to optical sensor(s)/camera(s) 1064 (on the front of a device), one or more rear-facing cameras or optical sensors that are pointed opposite from the display may be used instead of, or in addition to, an optical sensor(s)/camera(s) 1064 on the front of a device.

Example Computer System

Figure 12:
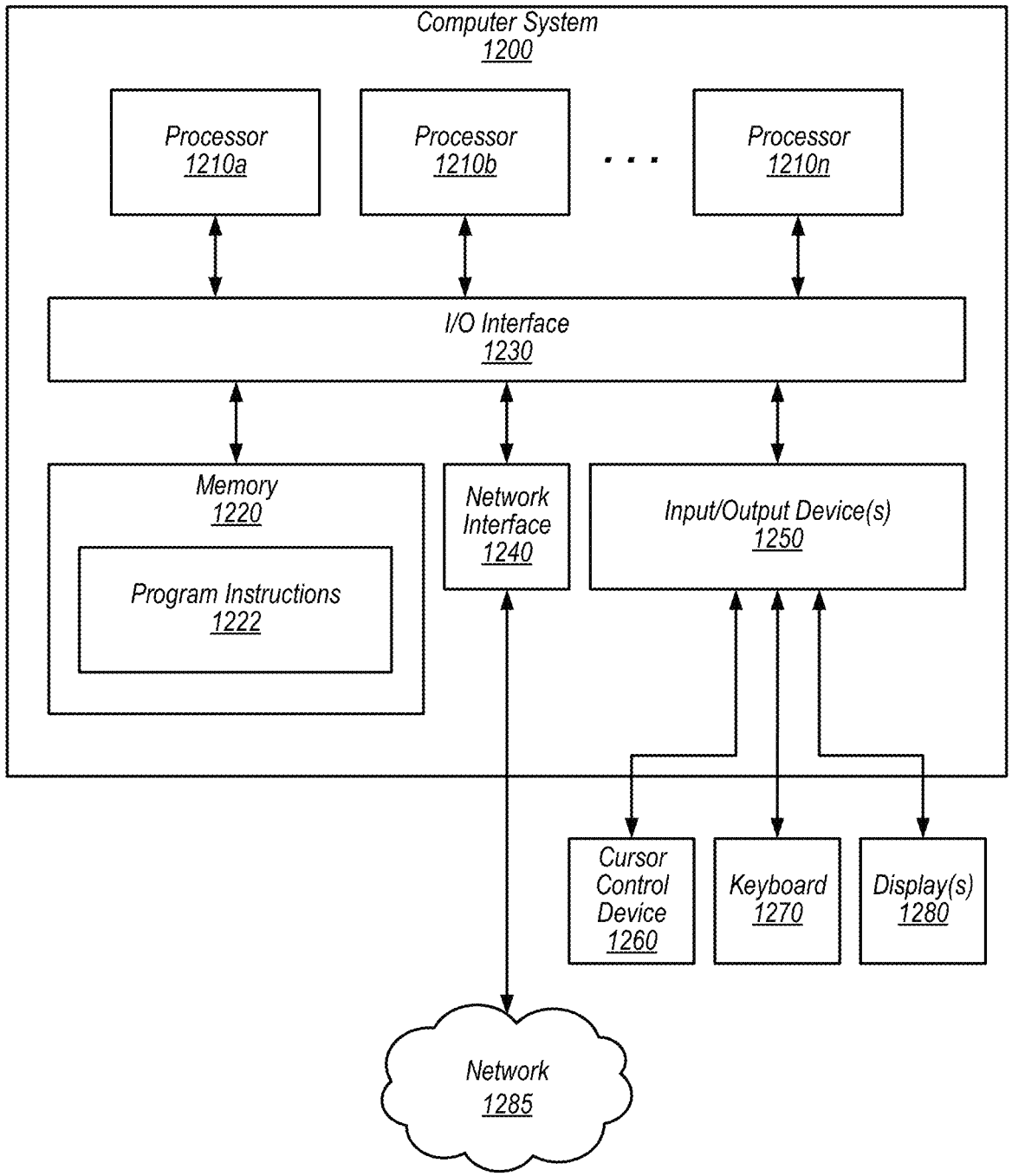
FIG. 12 illustrates an example computer system that may include a camera, in accordance with some embodiments.

FIG. 12 illustrates an example computer system 1200 that may include one or more cameras, in accordance with some embodiments. In some embodiments, the computer system

1200 may include one or multiple features, components, and/or implement functionality of embodiments described herein with reference to FIGS. 1-11.

The computer system 1200 may be configured to execute any or all of the embodiments described above. In different embodiments, computer system 1200 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device.

Various embodiments of a camera motion control system as described herein, including embodiments of magnetic position sensing, as described herein may be executed in one or more computer systems 1200, which may interact with various other devices. Note that any component, action, or functionality described above with respect to FIGS. 1-11 may be implemented on one or more computers configured as computer system 1200 of FIG. 12, according to various embodiments. In the illustrated embodiment, computer system 1200 includes one or more processors 1210 coupled to a system memory 1220 via an input/output (I/O) interface 1230. Computer system 1200 further includes a network interface 1240 coupled to I/O interface 1230, and one or more input/output devices 1250, such as cursor control device 1260, keyboard 1270, and display(s) 1280. In some cases, it is contemplated that embodiments may be implemented using a single instance of computer system 1200, while in other embodiments multiple such systems, or multiple nodes making up computer system 1200, may be configured to host different portions or instances of embodiments. For example, in one embodiment some elements may be implemented via one or more nodes of computer system 1200 that are distinct from those nodes implementing other elements.

In various embodiments, computer system 1200 may be a uniprocessor system including one processor 1210, or a multiprocessor system including several processors 1210 (e.g., two, four, eight, or another suitable number). Processors 1210 may be any suitable processor capable of executing instructions. For example, in various embodiments processors 1210 may be general-purpose or embedded processors implementing any of a variety of instruction set architectures (ISAs), such as the x86, PowerPC, SPARC, or MIPS ISAs, or any other suitable ISA. In multiprocessor systems, each of processors 1210 may commonly, but not necessarily, implement the same ISA.

System memory 1220 may be configured to store program instructions 1222 accessible by processor 1210. In various embodiments, system memory 1220 may be implemented using any suitable memory technology, such as static random access memory (SRAM), synchronous dynamic RAM (SDRAM), nonvolatile/Flash-type memory, or any other type of memory. Additionally, existing camera control data 1232 of memory 1220 may include any of the information or data structures described above. In some embodiments, program instructions and/or data may be received, sent or stored upon different types of computer-accessible media or on similar media separate from system memory 1220 or computer system 1200. While computer system 1200 is described as implementing the functionality of functional blocks of previous figures, any of the functionality described herein may be implemented via such a computer system.

In one embodiment, I/O interface 1230 may be configured to coordinate I/O traffic between processor 1210, system memory 1220, and any peripheral devices in the device, including network interface 1240 or other peripheral interfaces, such as input/output devices 1250. In some embodiments, I/O interface 1230 may perform any necessary protocol, timing or other data transformations to convert data signals from one component (e.g., system memory 1220) into a format suitable for use by another component (e.g., processor 1210). In some embodiments, I/O interface 1230 may include support for devices attached through various types of peripheral buses, such as a variant of the Peripheral Component Interconnect (PCI) bus standard or the Universal Serial Bus (USB) standard, for example. In some embodiments, the function of I/O interface 1230 may be split into two or more separate components, such as a north bridge and a south bridge, for example. Also, in some embodiments some or all of the functionality of I/O interface 1230, such as an interface to system memory 1220, may be incorporated directly into processor 1210.

Network interface 1240 may be configured to allow data to be exchanged between computer system 1200 and other devices attached to a network 1285 (e.g., carrier or agent devices) or between nodes of computer system 1200. Network 1285 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1240 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1250 may, in some embodiments, include one or more display terminals, keyboards, keypads, touchpads, scanning devices, voice or optical recognition devices, or any other devices suitable for entering or accessing data by one or more computer systems 1200. Multiple input/output devices 1250 may be present in computer system 1200 or may be distributed on various nodes of computer system 1200. In some embodiments, similar input/output devices may be separate from computer system 1200 and may interact with one or more nodes of computer system 1200 through a wired or wireless connection, such as over network interface 1240.

As shown in FIG. 12, memory 1220 may include program instructions 1222, which may be processor-executable to implement any element or action described above. In one embodiment, the program instructions may implement the methods described above. In other embodiments, different elements and data may be included. Note that data may include any data or information described above.

Those skilled in the art will appreciate that computer system 1200 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 1200 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1200 may be transmitted to computer system 1200 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A camera, comprising:
 a lens that defines an optical axis;
 an image sensor;
 a voice coil motor (VCM) actuator, including:
  a lens carrier configured to hold the lens;
  a magnet;
  a coil structure, including:
   a base portion that is attached to and surrounds a perimeter of the lens carrier; and
   at least one folded portion extending from the base portion in a folded arrangement, the at least one folded portion comprising:
    a straight portion comprising at least one coil formed of additive layers; and
    a fold between the base portion and the straight portion;
 wherein the VCM actuator is configured to shift the lens, relative to the image sensor, based at least in part on magnetic interaction between the at least one coil and the magnet.

2. The camera of claim 1, further comprising:
 a spring that connects the coil structure to a static member of the camera such that the coil structure is supported at least partly via the spring;
 the spring includes:
  a first portion that is coupled to the base portion; and
  a plurality of channels that extend from the first portion to the static member.

3. The camera of claim 2, wherein the spring is formed of a metal substrate from which the coil structure is additively formed.

4. The camera of claim 2, wherein:
 the coil structure further includes one or more electrodes on the base portion; and
 the spring is coupled to the base portion via the one or more electrodes.

5. The camera of claim 2, wherein the spring includes:
 one or more electrical traces configured to route current to the at least one coil to drive the coil;
 one or more insulator layers that electrically isolate the one or more electrical traces.

6. The camera of claim 1, wherein to shift the lens, the VCM actuator is configured to at least one of:
 move the lens along the optical axis; or
 tilt the lens relative to the optical axis.

7. The camera of claim 1, wherein:
 the at least one folded portion is additively formed together with the base portion; and
 the additive layers include:
  a conductive material; and
  an insulating material.

8. A voice coil motor (VCM) actuator, comprising:
 a moveable member that is moveable along a movement axis;
 a plurality of magnets; and
 a coil structure, including:
  a base portion that extends around at least a portion of the moveable member in directions along a first plane that is orthogonal to the movement axis; and
  folded portions that individually include a respective coil of a plurality of coils, wherein a folded portion of the folded portions is additively formed together with the base portion and extends from the base portion in a folded arrangement such that current flows through a coil, located in the folded portion and formed of additive layers, in directions along a second plane that is parallel to the movement axis;
 wherein the VCM actuator is configured to move, based at least in part on magnetic interaction between the coil and at least one of the plurality of magnets, the moveable member along the movement axis.

9. The VCM actuator of claim 8, wherein:
 the folded portion is a first folded portion to a first side of the moveable member and proximate a first magnet of the plurality of magnets; and
 the folded portions further comprise:
  a second folded portion to a second side of the moveable member and proximate a second magnet of the plurality of magnets, wherein the second folded portion is opposite the first folded portion relative to the moveable member;

a third folded portion to a third side of the moveable member and proximate a third magnet of the plurality of magnets; and a fourth folded portion to a fourth side of the moveable member and proximate a fourth magnet of the plurality of magnets, wherein the fourth folded portion is opposite the third folded portion relative to the moveable member.

10. The VCM actuator of claim 9, wherein each of the folded portions includes:

a respective first straight portion extending in a first direction that is parallel to the first plane;

a respective second straight portion extending in a second direction orthogonal to the first direction; and a respective intermediate portion that extends from the respective first straight portion to the respective second straight portion.

11. The VCM actuator of claim 10, wherein:

the respective coil is formed on the respective second straight portion; and the second straight portion extends upwardly above the base portion.

12. The VCM actuator of claim 8, further comprising:

a static member;

wherein:

the coil structure further includes a spring that connects the coil structure to the static member such that the coil structure is suspended at least partly via the spring;

the spring includes:

a first portion that is formed on the base portion of the coil structure; and a plurality of channels that extend from the first portion to the static member.

13. The VCM actuator of claim 8, wherein:

the folded portions are additively formed together with the base portion; and the additive layers include:

a conductive material that includes copper; and an insulating material that includes polyimide.

14. The VCM actuator of claim 8, wherein each of the plurality of magnets is a dual pole magnet.

15. The VCM actuator of claim 8, wherein:

the moveable member is a lens carrier of a camera module;

the lens carrier is configured to hold a lens that defines an optical axis, wherein the optical axis is the movement axis; and the VCM actuator is configured to at least one of:

move the lens along the optical axis; or tilt the lens relative to the optical axis.

16. A method of manufacturing a voice coil motor (VCM) actuator, the method comprising:

forming, using an additive process that is different than a wound coil forming process, a flat coil structure that includes a plurality of actuator coils; and folding portions of the flat coil structure to form a folded coil structure that includes:

a base portion that is configured to surround a perimeter of a lens carrier of a camera; and a plurality of folded portions extending from the base portion, wherein each of the plurality of folded portions includes a respective actuator coil of the plurality of actuator coils.

17. The method of claim 16, wherein the forming the flat coil structure further includes:

coating a metal substrate with an insulator layer;

exposing, using a lithographic process, one or more areas of the insulator layer;

sputtering the one or more exposed areas with a seed layer; and forming a conductive layer by plating the seed layer.

18. The method of claim 17, wherein:

the insulator layer comprises liquid polyimide; and the conductive layer comprises copper.

19. The method of claim 16, wherein the forming the flat coil structure further includes:

forming a spring such that the spring includes:

a first portion on the base portion of the flat coil structure; and a plurality of channels that extend outwardly from the first portion;

wherein forming the spring includes etching away a first portion of the metal substrate to leave a second portion of the metal substrate that includes spring.

20. The method of claim 16, further comprising:

coupling a first portion of a spring to the base portion via one or more electrodes formed on the base portion;

wherein the spring includes a plurality of channels extending outwardly from the first portion.

* * * * *